United States Patent [19]
Suda et al.

[11] Patent Number: 5,543,839
[45] Date of Patent: Aug. 6, 1996

[54] FOCUS ADJUSTING DEVICE WHEREIN EFFECTIVE FOCAL LENGTH IS DERIVED BY DETECTING LOW FREQUENCY CHANGES IN IMAGE SIGNALS

[75] Inventors: Hirofumi Suda; Masamichi Toyama; Akihiro Fujiwara, all of Kanagawa-ken; Kunihiko Yamada, Tokyo; Katsuji Yoshimura, Kanagawa-ken, all of Japan

[73] Assignee: Canon Kabushiki Kaisha, Tokyo, Japan

[21] Appl. No.: 225,249

[22] Filed: Apr. 8, 1994

Related U.S. Application Data

[63] Continuation of Ser. No. 961,220, Oct. 15, 1992, abandoned, which is a continuation of Ser. No. 650,977, Feb. 1, 1991, abandoned, which is a continuation of Ser. No. 496,134, Mar. 19, 1990, abandoned, which is a continuation of Ser. No. 154,795, Feb. 11, 1988, abandoned.

[30] Foreign Application Priority Data

Feb. 17, 1987 [JP] Japan .................. 62-34347

[51] Int. Cl.$^6$ ................................. H04N 5/232
[52] U.S. Cl. ............................ 348/349; 348/345
[58] Field of Search ....................... 348/345, 349, 348/354, 355, 346, 347, 348; 354/400, 402; H04N 5/232

[56] References Cited

U.S. PATENT DOCUMENTS

| | | | |
|---|---|---|---|
| 4,611,244 | 9/1986 | Hanma et al. | 358/227 |
| 4,735,494 | 4/1988 | Makino et al. | 350/429 |
| 4,902,115 | 2/1990 | Takahashi | 350/449 |

FOREIGN PATENT DOCUMENTS

| | | | |
|---|---|---|---|
| 55-132910 | 9/1980 | Japan | H04N 5/26 |
| 74272 | 4/1988 | Japan | H04N 5/232 |

*Primary Examiner*—Wendy R. Greening
*Assistant Examiner*—Tuan V. Ho
*Attorney, Agent, or Firm*—Robin, Blecker, Daley and Driscoll

[57] ABSTRACT

A focus adjusting device having an added capability of discriminating effective focal length information by using an image signal produced from an image pickup element is provided with an automatic focus adjusting circuit for moving a lens to the in-focus position on the basis of a high-frequency component in the image signal, and a circuit for discriminating effective focal length information of the lens from the degree of change of a low-frequency component in the image signal, wherein the gain of the automatic focus adjusting circuit is controlled in accordance with the discriminated focal length information.

34 Claims, 6 Drawing Sheets

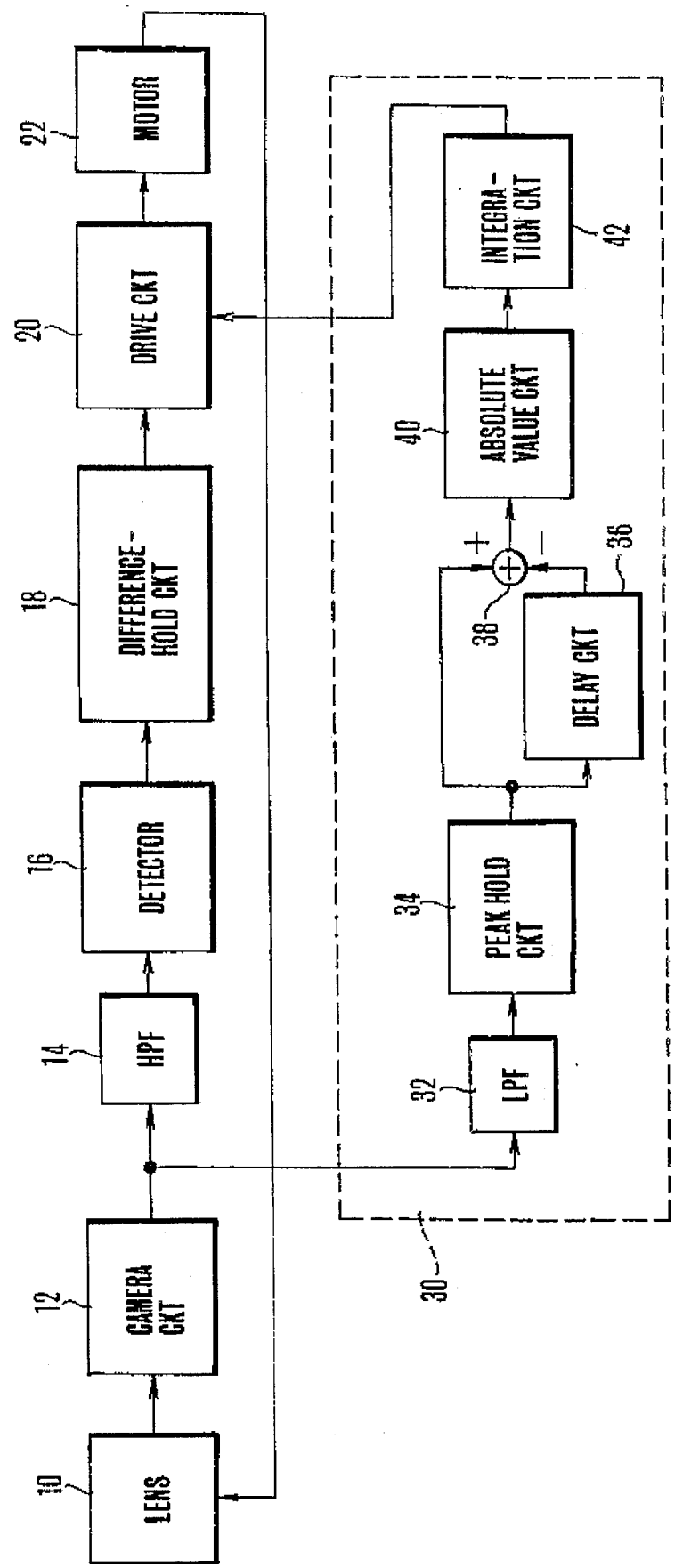

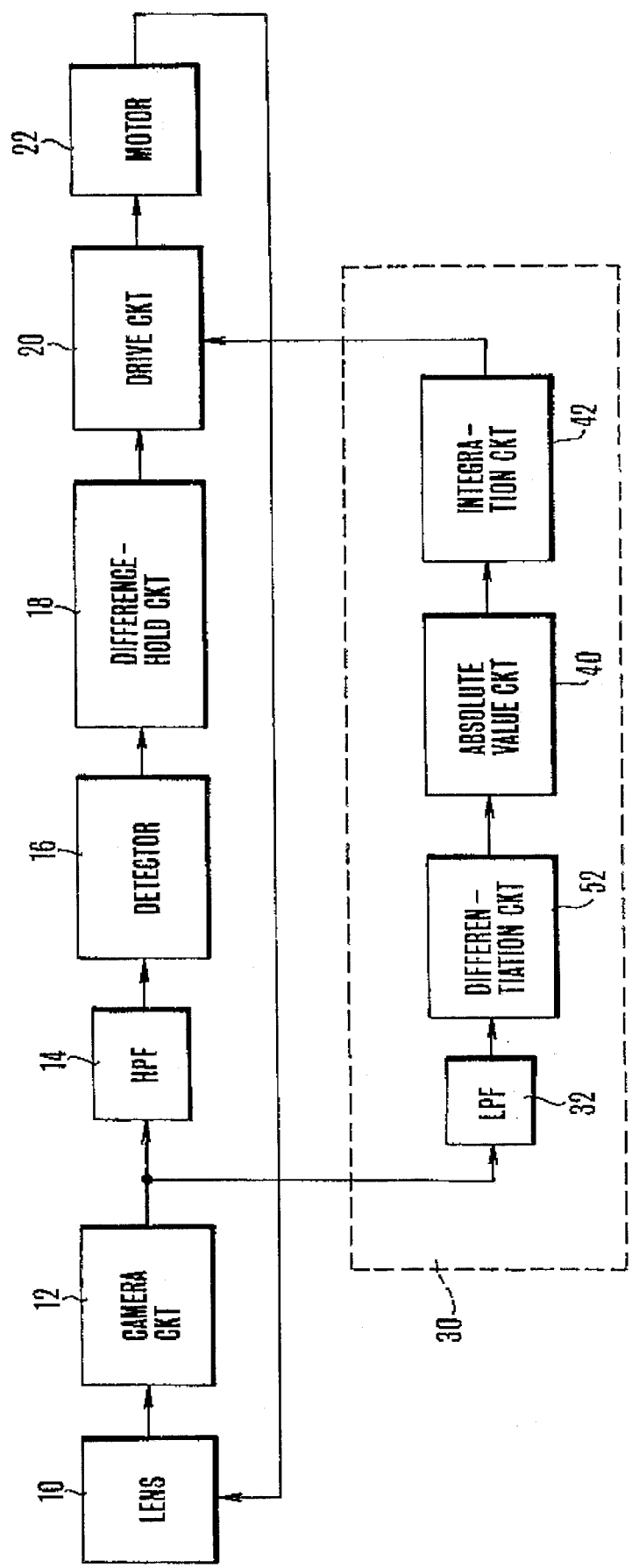

FOCUS ADJUSTING DEVICE WHEREIN EFFECTIVE FOCAL LENGTH IS DERIVED BY DETECTING LOW FREQUENCY CHANGES IN IMAGE SIGNALS

This is a continuation application under 37 CFR 1.62 of application Ser. No. 07/961,220, filed Oct. 15, 1992 now abandoned, which is a continuation of Ser. No. 07/650,977 filed Feb. 1, 1991 (abandoned), which is a continuation of Ser. No. 07/496,134 filed Mar. 19, 1990 (abandoned), which is a continuation of Ser. No. 07/154,795 filed Feb. 11, 1988 (abandoned).

BACKGROUND OF THE INVENTION

1. Field of the Invention

This invention relates to a device for discriminating the focal length of an optical system and, more particularly, to a focal length discriminating device suited to the automatic focusing system of video camera using a zoom lens.

2. Description of the Related Art

A wide variety of auto-focus types have been employed in video cameras, etc. Upon finding the phenomenon that the proportion of the high-frequency component in the video signal obtained from the image pickup element or the like varies as a function of the degree of fineness of the picked-up image, a method for controlling the operation of the focus adjusting ring (hereinafter called "helicoid") of the photographic optical system in such a manner as to maximize that high-frequency component, or the so-called "Hill Climb" method, has been proposed as disclosed in great detail in the NHK Technology Research Report 1965, p. 21, Vol. 17, No. 1, serial No. 86 entitled "Automatic Focus Adjustment of Television Camera by the Hill Climb Servo Method" by Ishida et al.

FIG. 1 in block diagram shows the construction of the principal parts of the automatic focusing system based on this "Hill Climb" method. The system includes a photographic optical system or lens 10, a camera circuit 12 receptive of photo-signals from an image pickup element for producing electrical or video signals, and a high pass filter (HPF) 14 for taking the high-frequency component out of the video signal from the camera circuit 12. Responsive to the high-frequency component from the HPF 14, a detector 16 produces an output whose level represents the degree of fineness of an image of an object to be photographed. Its characteristic curve is shown, in FIG. 2, upward convex with the abscissa in the adjusted position of the helicoid. From this, it is stipulated that the focus state in the position A of FIG. 2 is sharpest. A difference-hold circuit 18 samples and holds the output of the detector 16 (hereinafter referred to as "focus voltage") at predetermined times, producing an output signal representing the differentiated variation of the focus voltage with respect to time. So, the output signal of the difference-hold circuit 18, as shown in FIG. 2, becomes zero at the in-focus position A, and takes positive or negative sign on the front or rear side thereof. The characteristic shown in FIG. 2, regardless of whether focusing is effected down from the closest object distance to infinity, or vice versa, remains the same.

Based on the polarity of the output of the difference-hold circuit 18, a motor drive circuit 20 determines the direction in which a motor 22 serving as the drive source for the lens 10 (specifically speaking, its helicoid) rotates. In some systems the speed of rotation of the motor 22 is also adjusted in accordance with the output level of the difference-hold circuit 18. In such a manner, as the motor or helicoid control loop is recycled, the focus voltage at the output of the detector 16 is climbing up the hill, finally reaching its peak. Then, while fluctuating around the maximum to very small extent, it assumes the stationary state.

The application of the automatic focusing device described above to a case that the focal length of the lens 10 is fixed presents no problem. But, when applied to another case in which the lens 10 is a zoom lens, the characteristic curve of the focus voltage (the amplitude of the high-frequency component of the video signal) differs with different zoom positions as shown in FIG. 3. Therefore, a problem arises in that the response speed of focus adjustment varies with variation of the focal length of the lens 10. This is because the field depth and the image angle vary depending on the focal length. As a result, if, as the gain of the automatic focusing loop shown in FIG. 1 (more specifically speaking, the gain of the motor drive circuit 20) is set to an appropriate value to, for example, the telephoto end, the zoom lens 10 is moved to the wide angle end, the response is very slow. Hence, the time necessary to reach the in-focus position becomes very long. To improve this, a technique has been proposed wherein the zoom lens 10 is provided with an encoder for producing zoom information in the form of an electrical signal, and this electrical signal is used to automatically adjust the above-described loop gain, or, more specifically, the gain of the motor drive circuit 20 so that the motor drive speed is maintained constant over the entire zooming range. As the prior art of this sort, mention may be made of, for example, Japanese Laid-Open Patent Application No. Sho 57-58467.

But, this zoom encoder is to convert the mechanical position of the zoom actuator to an electrical signal. Also because it must be used in each item of zoom lens, an increase in price of the zoom lens is called for. Further, because it is in the lens mounting that the zoom encoder is built with high precision accuracy, there is another drawback that the structure becomes complicated, and the size of the lens mounting is increased.

SUMMARY OF THE INVENTION

The present invention has been made to eliminate the above-described problems, and its object is to provide a focal length discriminating device capable, without using the zoom encoder as in the prior art, of substantially obtaining zoom information as an electrical signal.

To achieve this object, according to an embodiment of the invention, since the distribution of spatial frequencies of an optical image of an object to be photographed corresponds to a frequency distribution of the video signal, because the spatial frequencies of the object image have a tendency to shift to higher values when in wide angle photography than when in telephoto photography, there is a certain relationship between the low frequency component of the image signal and the effective focal length of the used optical system. To utilize this, a focal length discriminating device includes image pickup means for converting the object image formed on the light receiving plane thereof to an image signal and discriminating means for discriminating the effective focal length information of the optical system from the low-frequency component of the image signal, whereby, without having to use the zoom encoder or other like element solely used for obtaining zoom information, a simple electrical circuit suffices for obtaining the effective focal length information of the used optical system (in the case of the zoom lens, the zoom information) in the form of an electrical signal.

BRIEF DESCRIPTION OF THE DRAWINGS

FIG. 4 is a block diagram illustrating the structure of an embodiment of an automatic focusing system according to the invention.

FIG. 8 is a block diagram of the structure of still another embodiment of the invention.

DETAILED DESCRIPTION OF THE PREFERRED EMBODIMENTS

Figure 1:
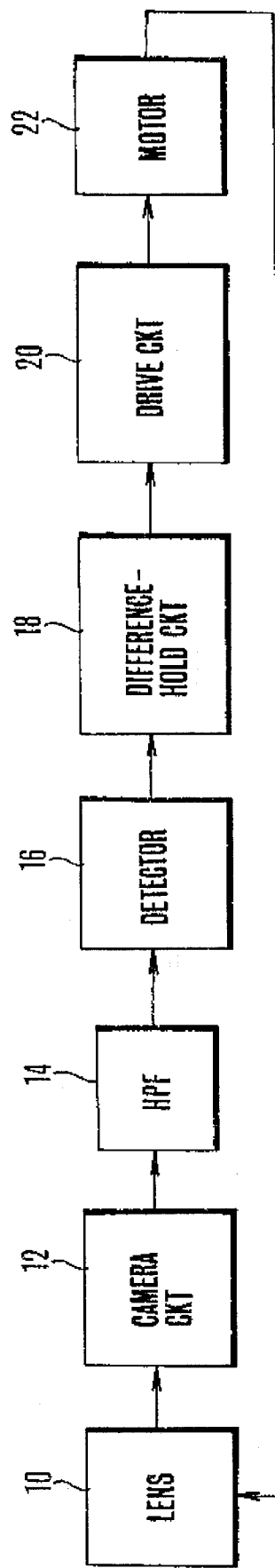
FIG. 1 is a block diagram of the principal structure of the conventional automatic focusing system.
Figure 2:
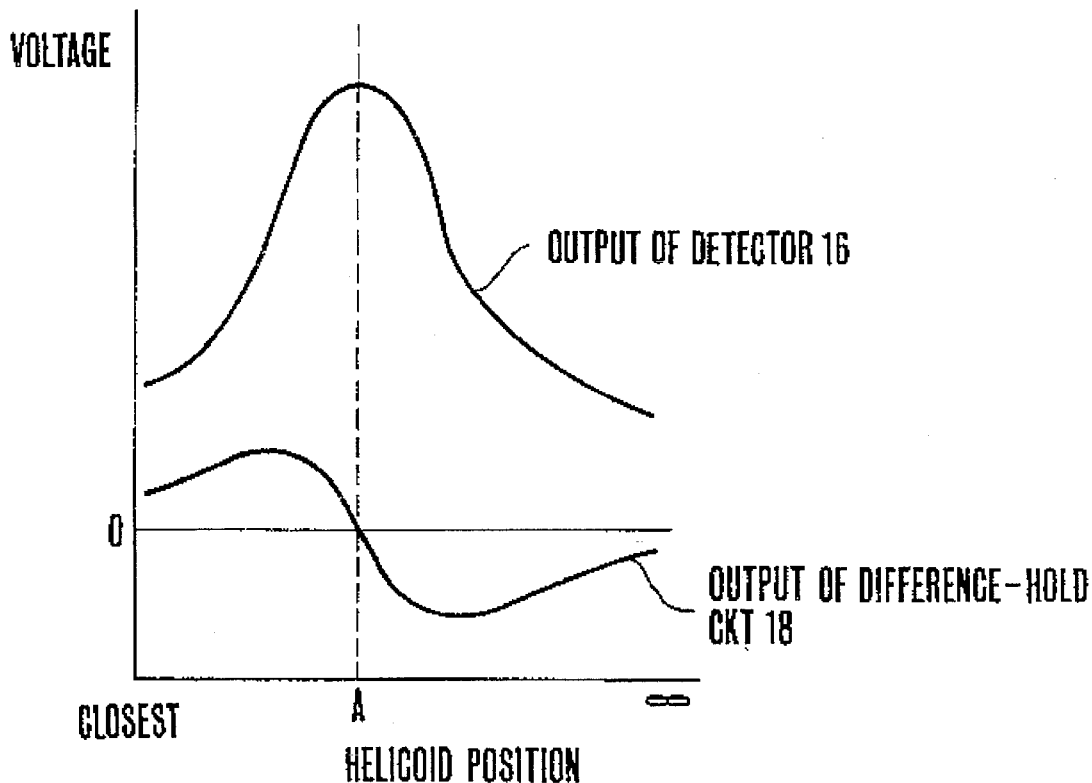
FIG. 2 shows characteristic curves of the conventional automatic focusing system of FIG. 1.

The present invention is next described in connection with embodiments thereof by reference to the drawings. FIG. 4 in block diagram shows a first embodiment of the invention applied to the Hill Climb type automatic focusing system of FIG. 1, and the similar constituent parts to those of the conventional example shown in FIG. 1 are denoted by the same reference numerals.

In FIG. 4, receiving the video signal produced from the camera circuit 12, a zoom information computing circuit 30 derives information representing the zoom position of the lens 10. A low-pass filter (LPF) 32 then removes the high band component out of the video signal produced from the camera circuit 12 to extract a signal which is not highly sensitive to whether the image is in focus or out of focus. A peak hold circuit 34 then holds the output signal of the LPF 32 in each very short predetermined time t. A delay circuit 36 causes the output of the peak hold circuit 34 to delay by the time t. The output of the delay circuit 36 is then subtracted from the output of the peak hold circuit 34 by a subtractor 38. An absolute value circuit 40 changes the polarity of the output of the subtractor 38, if negative, to the positive one. An integration circuit 42 then integrates the output of the absolute value circuit 40 during one vertical period in the video rate. The level of the output of the integration circuit 42 contains information as to what extent the video signal at the output of the camera circuit 12 varies spatially to, or information dependent on the zoom state of the zoom lens. It is in accordance with the level of the output signal of the integration circuit 42 that the gain of the motor drive circuit 20 is controlled.

Figure 5A:
FIGS. 5(a)–5(c) are waveforms of the signals when the zoom lens is set in the wide angle end.
Figure 5B:
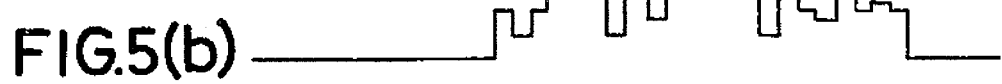
Figure 5C:
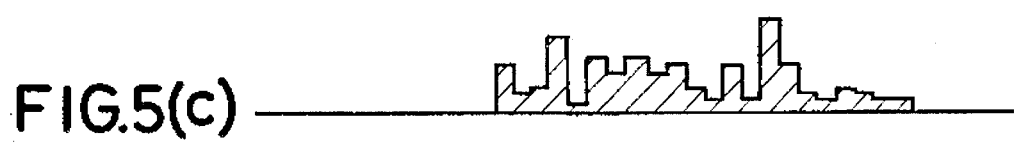
Figure 6A:
FIGS. 6(a)–6(c) are waveforms of the signals when the zoom lens is set in the telephoto end.
Figure 6B:
Figure 6C:

FIGS. 5(a)–5(c) schematically show how the signal of the zoom information computing circuit 30 varies over one horizontal scanning period when the zoom position of the lens 10 is set in the wide angle end. FIGS. 6(a)–6(c) are similar to FIGS. 5(a)–5(c) respectively except for the telephoto end. 43 represents the horizontal synchronizing signal. FIGS. 5(a) and 6(a) are waveforms of the output of the LPF 32. Since, in the wide angle end (the shortest focal length setting), the spatial frequencies in the image pickup plane are generally high as compared with the telephoto end (the longest focal length setting), because the signal for the wide angle end contains more high-frequency components within the pass range of the LPF 32 than that for the telephoto end. So, the curve in FIG. 5(a) has a higher frequency of change than that in FIG. 6(a). In other words, the use of the high-band cut-off frequency of the LPF 32 enables the telephoto and wide angle ends to be discriminated from each other in the form of a quantitative difference of the spatial frequency. And, its value is so defined that a frequency component may be used which is not dependent on whether the image is in focus or out of focus. By the peak hold circuit 34, discrete values are obtained as shown by the waveforms in FIGS. 5(b) and 6(b). The delay circuit 36, the subtractor 38 and the absolute value circuit 40 cooperate to compute the amount of change of the signal. The output of the absolute value circuit 40 takes such shapes as shown in FIGS. 5(c) and 6(c). The integration circuit 42 integrates the signal shown in FIGS. 5(c) or 6(c) during one vertical scanning period. Because, in the wide angle positions, the brightness of the image very frequently changes over the area of the image frame, the integration circuit 42 produces a large output. In the telephoto positions, on the other hand, because the frequency of change of the brightness over the area of the image frame is less, the output of the integration circuit 42 becomes smaller.

Figure 3:
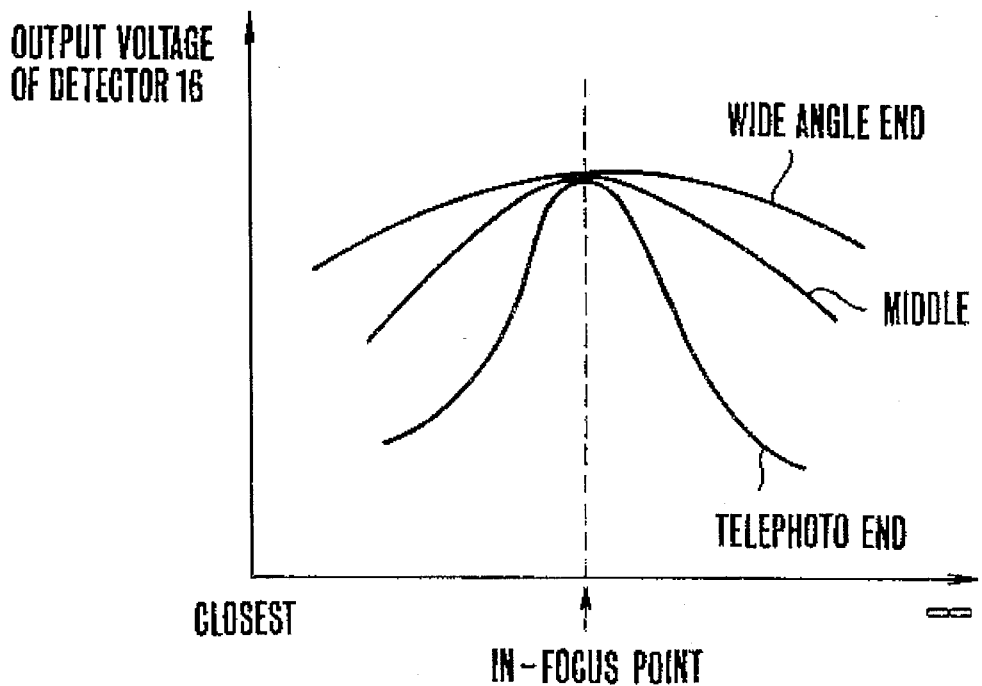
FIG. 3 is a graph illustrating the variation of the characteristic curve of the focus voltage with the zoom position of the zoom lens.

Responsive to this output of the integration circuit 42, the motor drive circuit 20 changes its gain so as to compensate for the difference of the characteristic shown in FIG. 3. In more detail, for example when in the wide angle positions, the gain of the drive circuit 20 is increased to speed up the response. When in the telephoto positions, the gain of the drive circuit 20 is decreased to prevent the response from becoming too fast. Thus, it results that even if the zoom lens is in any zoom position, the in-focus state can be reached in a time almost equal to an average time.

Figure 7:
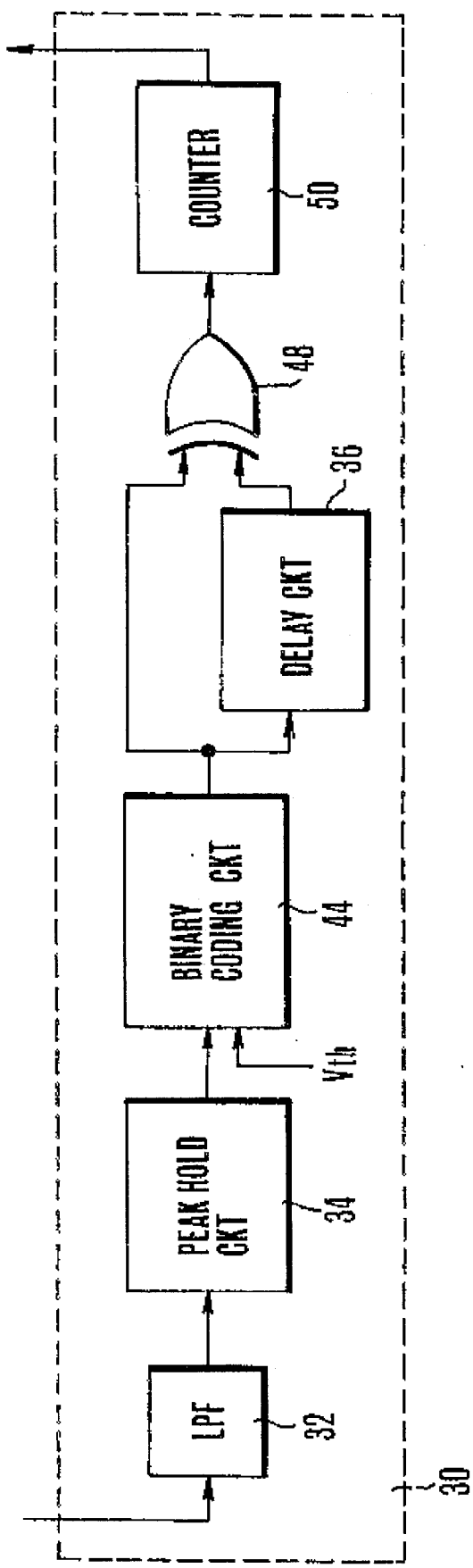
FIG. 7 is a block diagram of the structure of another embodiment of the invention.

FIG. 7 shows another example of construction of the zoom information computing circuit 30, where the similar parts to those shown in FIG. 4 are denoted by the same reference numerals. In this example, the output of the peak hold circuit 34 is applied to a binary coding circuit 44. $V_{th}$ is a threshold value to that circuit. The delay circuit 36 of delay time t and an exclusive OR gate 48 cooperate to examine whether or not the output of the binary coding circuit 44 has changed. A counter 50 then counts the number of times it has changed. The counted value for every one vertical scanning period of the counter 50 is supplied to the motor drive circuit 20. With this constructional feature, because the signal is binary coded, the zoom information is inferior in precision accuracy to that in the system of FIG. 4, but there are advantages over the latter that the production cost is lowered, and that because the zoom information is obtained in a digital form, application to instruments of digital control capabilities is easier.

FIG. 8 exemplifies an analog form of the zoom information computing circuit 30, as obtained by substituting an analog differentiation circuit 52 for that section of the system of FIG. 4 which is comprised of the peak hold circuit 34, the delay circuit 36 and the subtractor 38. The other components are similar in construction and arrangement to those of FIG. 4.

Though the foregoing embodiments have been described as to compute the zoom information of the zoom lens, it is to be understood that the present invention is applicable to the interchangeable lens type video camera or electronic still camera. For this case, the focal length information of the interchanged lens is obtained to automatically adjust the loop gain of the automatic focusing system. Another example of variation is that adjustment of the gain for the automatic focusing loop may be made in a place other than the motor drive circuit 20, provided that this place lies in the loop.

Also, though the illustrated embodiments have been described by taking an example of the automatic focusing system of the type in which the focus signal is obtained from the high-frequency component of the video signal produced from the camera circuit 12, the invention is not confined thereto. The invention is applicable to other types of automatic focusing systems in which the focus signal characteristic differs with different effective focal lengths of the used lenses.

According to the above-described embodiments, the focusing control of the optical system can be attained at an optimum speed of response regardless of what an effective focal length the used optical system has, so that the optical system can be brought into the in-focus position quickly and smoothly. Thus, the necessity of using the zoom encoder in the zoom lens is obviated.

As is easily understandable from the foregoing explanation, according to the invention, creation of the effective focal length information of the used optical system is achieved without recourse to a separate mechanism solely used for obtaining the zoom information, such as the zoom encoder, but only by using electrical circuit elements of simple structure.

What is claimed is:

1. A focal length information detecting device comprising:
   (A) image pickup means for converting an image of an object to be photographed formed on an image pickup plane thereof by a photographic optical system to an image signal; and
   (B) detecting means for detecting a predetermined signal component of said image signal corresponding to a focal length of said photographic optical system on the basis of the change of a component of prescribed low-frequency range in said image signal, said component of prescribed low-frequency range being in such a frequency band as not to change depending on in-focus or defocus, but to vary according to a variation of the focal length of said photographic optical system.

2. A device according to claim 1, wherein said detecting means quantifies the change of said low-frequency component in such a way that said low-frequency component is sampled and the difference between successive ones of the sampled values is integrated.

3. A device according to claim 2, wherein said detecting means includes:
   (A) a low pass filter for extracting said low-frequency component out of the image signal produced from said image pickup means;
   (B) a peak detecting circuit for detecting a peak value of the image signal passing through said low pass filter in predetermined periods;
   (C) an absolute value circuit for comparing an output of said peak detecting circuit with that produced a predetermined period before to detect an absolute value of their difference; and
   (D) an integration circuit for quantifying an output of said absolute value circuit by integration during one field period.

4. A device according to claim 1, wherein said detecting means codes said low-frequency component to binary form in each predetermined period, and compares it with the previous value to quantify the change of said low-frequency component in the form of a number of times it has changed.

5. A device according to claim 4, wherein said detecting means includes:
   (A) a low pass filter for extracting said low-frequency component out of the image signal produced from said image pickup means;
   (B) a peak detecting circuit for detecting a peak value of the image signal passing through said low pass filter in each predetermined period;
   (C) a binary coding circuit for comparing an output of said peak detecting circuit with a predetermined threshold value to produce an output in a binary code;
   (D) a change detecting circuit for comparing the output of said binary coding circuit with the previous value to detect whether or not a change has occurred; and
   (E) a counter for counting an output of said change detecting circuit.

6. A device according to claim 1, wherein said detecting means differentiates said low-frequency component and then integrates the differentiation result during a predetermined period to quantify the change of said low-frequency component.

7. A device according to claim 6, wherein said detecting means includes:
   (A) a low pass filter for extracting said low-frequency component out of the image signal produced from said image pickup means;
   (B) a differentiation circuit for differentiating the image signal which has passed through said low pass filter;
   (C) an absolute value circuit for detecting an absolute value of an output of said differentiation circuit; and
   (D) an integration circuit for quantifying an output of said absolute value circuit by integration during one field period.

8. A device according to claim 1, further comprising focus adjusting means for driving said photographic optical system to effect focus adjustment, and for controlling a gain for driving said photographic optical system in accordance with the detected signal component obtained by said detecting means.

9. A device according to claim 8, wherein said photographic optical system includes a zoom lens, and said detecting means detects effective zoom position information of said zoom lens.

10. A device according to claim 9, wherein said focus adjusting means drives said photographic optical system in such a way that a high-frequency component in the image signal obtained from said image pickup means becomes maximum, and the gain for driving said photographic optical system of said automatic focus adjusting means is controlled to increase as said zoom position moves from the telephoto side to the wide angle side.

11. An automatic focusing device comprising:
   (A) image pickup means for converting an image of an object to be photographed formed on an image pickup plane thereof by a photographic optical system to an image signal;
   (B) automatic focus adjusting means for driving a photographic optical system on the basis of said image signal;
   (C) detecting means for detecting a predetermined signal component of said image signal corresponding to a focal length of said photographic optical system on the basis of the change of a component of prescribed low-frequency range in said image signal; and (D) control means for controlling the drive gain of said automatic focus adjusting means in accordance with an output of said detecting means.

12. A device according to claim 11, wherein said low-frequency component is in such a frequency band as not to change depending on in-focus or defocus, but to vary according to a variation of the focal length of said photographic optical system.

13. A device according to claim 12, wherein said photographic optical system includes a zoom lens.

14. A device according to claim 13, wherein the signal component detected by said detecting means includes information concerning a zoom position of said zoom lens, and said control means controls the drive gain in accordance with said information so that the time said automatic focus adjusting means takes to reach the in-focus position becomes constant regardless of said zoom position.

15. A device according to claim 14, wherein said control means decreases the loop gain for a photographic lens drive system of said automatic focus adjusting means to slow down the response when said zoom lens is on the telephoto side and increases said loop gain to speed up the response when on the wide angle side.

16. A device according to claim 11 or 15, wherein said automatic focusing adjusting means drives said photographic optical system in such a way that a high-frequency component in the image signal produced from said image pickup means becomes maximum.

17. An automatic focus adjusting device comprising:

(A) image pickup means for converting an image of an object to be photographed formed on an image pickup plane thereof by a photographic lens to an image signal;

(B) automatic focus adjusting means for driving said photographic lens in such a way that a high-frequency component in said image signal becomes maximum;

(C) detecting means for detecting a predetermined signal component of said image signal corresponding to a focal length of said photographic lens on the basis of the change of a component of prescribed low-frequency range in said image signal; and (D) correcting means for correcting the speed of response of said automatic focus adjusting means on the basis of the signal component detected by said detecting means.

18. A device according to claim 17, wherein said photographic lens includes a zoom lens, and said correcting means corrects the drive gain of said automatic focus adjusting means based on a change of a zoom position of said zoom lens.

19. A device according to claim 18, wherein said low-frequency component is in such a frequency band as not to change depending on in-focus or defocus, but to vary according to a variation of the focal length of said photographic optical system.

20. An image sensing apparatus, comprising:

A) image pickup means for converting an image formed on an image pickup plane by a photographic device to an image signal and outputting the image signal;

B) detecting means for detecting a predetermined low frequency signal component of said image signal varying on the basis of focal length information of said photographic device in the image signal, said predetermined low frequency signal component being in such a frequency band as not to substantially change depending on focus condition; and C) output means for outputting said predetermined low frequency signal component detected by said detecting means.

21. An apparatus according to claim 20, wherein said detecting means detects the focal length information from a change of the predetermined low frequency signal component of said image signal.

22. An apparatus according to claim 21, wherein said detecting means includes:

A) a low pass filter for extracting the predetermined low frequency signal component out of the image signal produced from said image pickup means;

B) a peak detecting circuit for detecting a peak value of the image signal passing through said low pass filter in each predetermined period;

C) an absolute value circuit for comparing an output of said peak detecting circuit with that produced a predetermined period before to detect an absolute value of a difference therebetween; and D) an integration circuit for quantifying an output of said absolute value circuit by integration during one field period.

23. An apparatus according to claim 21, wherein said detecting means codes said frequency component to binary form in each predetermined period, and compares it with the previous value to quantify the change of said frequency component in the form of a number of times it has changed.

24. An automatic focusing device comprising:

A) image pick up means for converting an image formed on an image pick up plane to an image signal;

B) focus control means for adjusting a focus condition of said image relative to said pick up plane;

C) detecting means for detecting a predetermined low frequency signal component in the image signal related to a focal length of said device; and D) control means for controlling a characteristic of the adjusting operation of said focus control means according to an output of said detecting means.

25. A device according to claim 24, wherein said detecting means detects the predetermined low frequency signal component in said image signal as effective focal length information.

26. A device according to claim 25, wherein said control means controls a speed of focus adjusting operation of said control means.

27. A device according to claim 26, wherein said low frequency component is in such a frequency band as not to change depending on in-focus or defocus, but to vary according to a variation of the focal length of said device.

28. A device according to claim 27, wherein said focus control means adjusts a focus condition of said device on the basis of a high frequency component in said image signal produced from said image pick up means.

29. An automatic focusing device comprising:

A) image pickup means for converting an image formed on an image pick up plane by an optical system to an image signal;

B) first detecting means for detecting a first predetermined signal component in said image signal corresponding to a focus condition;

C) focus control means for controlling said optical system to adjust the focus condition of said image relative to said image pick up plane on the basis of an output of said first detecting means;

D) second detecting means for detecting a second predetermined signal component in said image signal varying according to a field depth of said optical system; and E) correcting means for controlling a characteristic of the adjusting operation of said focus control means according to an output of said second detecting means.

30. A device according to claim 29, wherein said first predetermined signal is a high frequency component in said image signal.

31. A device according to claim 29, wherein said second predetermined signal is a frequency component lower than said first predetermined signal.

32. A device according to claim 29, wherein said correcting means corrects a speed of focus adjusting operation of said focus control means.

33. A device according to claim 29, wherein said correcting means corrects a drive gain of focus adjusting of focus control means.

34. A device according to claim 29, wherein said correcting means corrects a response of focus adjusting operation of focus control means.

* * * * *